(12) United States Patent
Duncan

(10) Patent No.: US 6,964,240 B1
(45) Date of Patent: Nov. 15, 2005

(54) HULL FOR HIGH SPEED WATER CRAFT

(75) Inventor: Ian James Duncan, Southampton (GB)

(73) Assignee: Futuretech Technologies Limited, Kent (GB)

(*) Notice: Subject to any disclaimer, the term of this patent is extended or adjusted under 35 U.S.C. 154(b) by 0 days.

(21) Appl. No.: 09/936,089

(22) PCT Filed: Mar. 9, 2000

(86) PCT No.: PCT/GB00/00868

§ 371 (c)(1),
(2), (4) Date: Sep. 7, 2001

(87) PCT Pub. No.: WO00/53487

PCT Pub. Date: Sep. 14, 2000

(30) Foreign Application Priority Data

Mar. 9, 1999 (GB) .................................... 9905427

(51) Int. Cl.[7] .............................................. B63B 1/00
(52) U.S. Cl. .................................. 114/61.26; 114/271
(58) Field of Search .................... 114/61.26, 61.32, 114/63, 271, 274, 283, 288, 291, 56.1; D12/309, D12/310, 313

(56) References Cited

U.S. PATENT DOCUMENTS

| | | | | |
|---|---|---|---|---|
| 2,271,277 A | * | 1/1942 | Roscher | 114/271 |
| 2,344,619 A | * | 3/1944 | Lake | 114/288 |
| 2,960,957 A | * | 11/1960 | Eddy | 114/271 |
| 3,195,496 A | * | 7/1965 | Skuce | 114/271 |
| 3,648,640 A | * | 3/1972 | Granger | 114/288 |
| 3,650,239 A | | 3/1972 | Gast | |
| 3,661,109 A | * | 5/1972 | Weiland | 114/291 |
| 3,745,963 A | * | 7/1973 | Fisher | 114/288 |
| 3,763,810 A | * | 10/1973 | Payne | 114/291 |
| 3,903,832 A | | 9/1975 | Ishida | |
| 3,991,696 A | * | 11/1976 | Aoki | 114/271 |
| 4,058,077 A | | 11/1977 | Johansson | |
| 4,165,703 A | | 8/1979 | Burg | |
| 4,509,927 A | | 4/1985 | Ikeda | |
| 4,774,902 A | * | 10/1988 | Sinclair, Jr. | 114/271 |
| 5,452,675 A | | 9/1995 | Devin | |
| 5,685,253 A | * | 11/1997 | Alexander, Jr. | 114/291 |

FOREIGN PATENT DOCUMENTS

| | | |
|---|---|---|
| DE | 2044999 | 1/1971 |
| EP | 0 304 821 A | 3/1989 |
| FR | 2 650 244 | 1/1991 |
| GB | 2 262 718 A | 6/1993 |

* cited by examiner

Primary Examiner—Andrew D. Wright
(74) Attorney, Agent, or Firm—Dykema Gossett PLLC

(57) ABSTRACT

The application relates to water craft hulls having improved hydrodynamic stability. A hull (1) is claimed in which the center of gravity ($C_g$) is substantially vertically aligned with the center of hydrodynamic lift ($C_p$) of a lifting surface of the hull, both at lift-off speed and at design speed, and preferably also at speeds below lift-off, and at all speeds between lift-off and design speed and above. A hull having a relatively high aspect ratio at design speed, and preferably also at lift-off speed, is also claimed. In the preferred embodiment, the hull is generally delta-shaped in plan view.

26 Claims, 9 Drawing Sheets

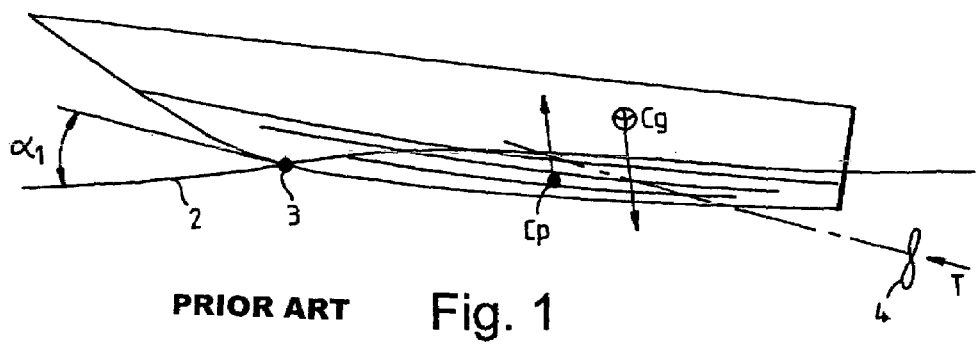
PRIOR ART Fig. 1
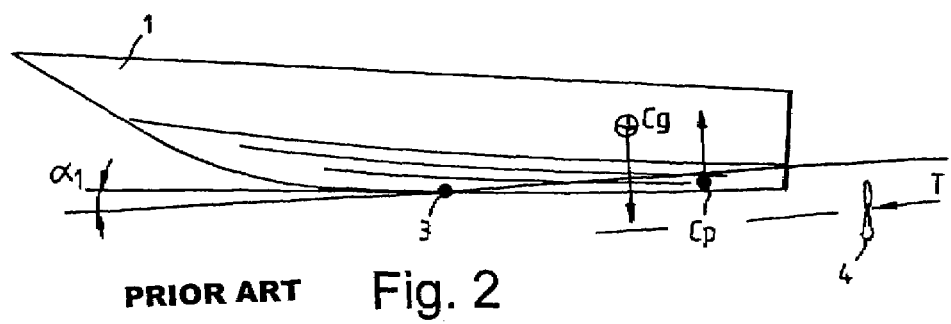
PRIOR ART Fig. 2

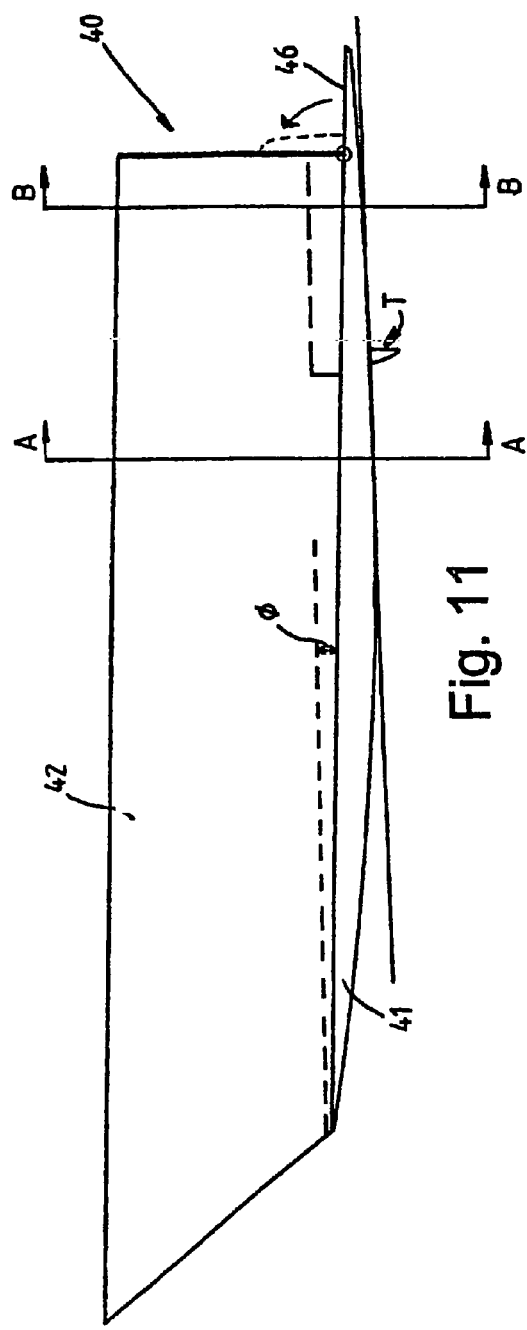
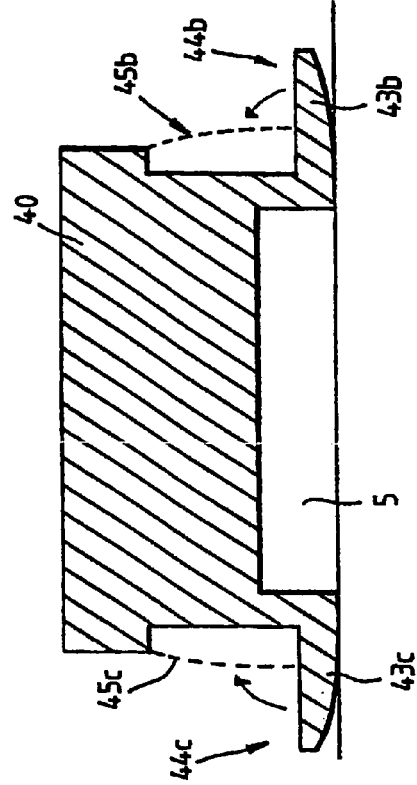
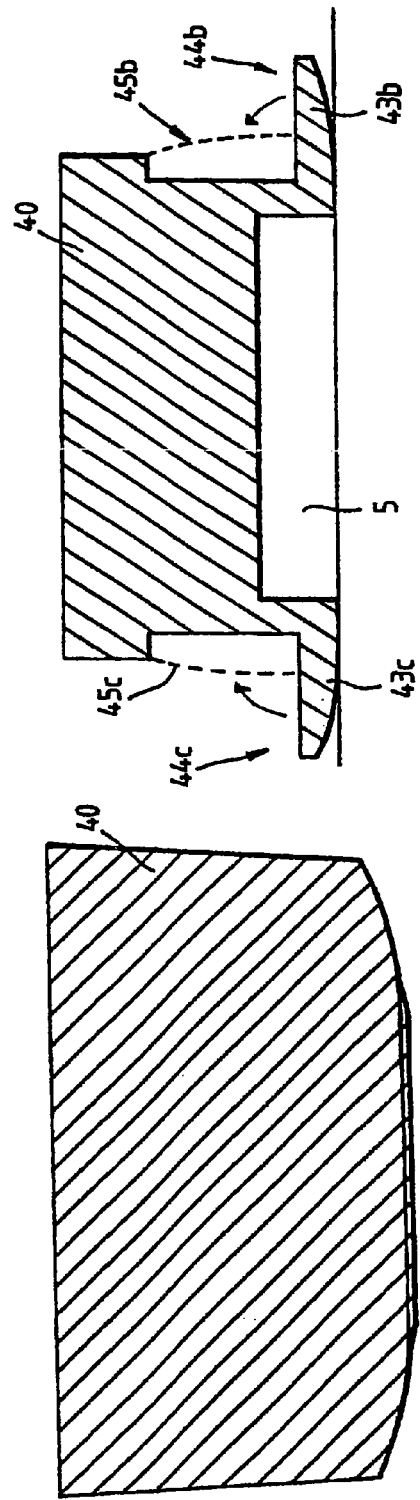
Fig. 11
Fig. 12(a)
Fig. 12(b)

HULL FOR HIGH SPEED WATER CRAFT

CROSS REFERENCE TO RELATED APPLICATION

The present application is the U.S. national stage application of International Application PCT/GB00/00868, filed Mar. 9, 2000, which international application was published on Sep. 14, 2000 as International Publication WO 00/53487 in the English language. The International Application claims priority of British Patent Application 9905427.2, filed Mar. 9, 1999.

SUMMARY OF THE INVENTION

The present invention relates to high speed planing boats and, in particular, hulls which reduce hydrodynamic drag and improve hydrodynamic stability in such boats.

Planing hulls of known art suffer from a number of draw-backs including:—

1) The centre of lift for the incidence required for minimum drag varies widely with speed. A number of ways of dealing with this problem are well established and include the fitting of variable trim tabs at the transom and trimming the propeller to provide a balancing moment. These methods have a negative influence on performance.

2) At high speeds hulls of known art are prone to longitudinal instability. At high angles of incidence most such hull types are prone to porpoising whilst such hulls, particularly those arranged with a convex entry to a generally flat rear section, are prone to instability at low angles of incidence.

3) Vee hulls of known art have lifting surfaces which operate at poor ratios of lift to drag due to a number of causes. Such hulls tend to have a substantially delta form of low aspect ratio, span$^2$/area, where the span is the transverse width of the lifting surface, and the area is the area of the lifting surface. This results in considerable tip losses. Additionally, the Froude number (Vs/ (g×L)), where 'L' is the longitudinal length of the surface, is low due to the high value of 'L' resulting in high spray drag and wave making drag. Furthermore, the spray sheet is projected laterally due to the Vee entry angle such that it is not generally entrained below the lifting surface.

4) At high speeds the hydrodynamic centre of lift is optimally arranged close to the transom whereas the aerodynamic lift centre is usually situated close to the centre of the craft and at some considerable distance forward of the hydrodynamic lift centre. This results in aerodynamic instability with the well known consequence that such craft have a marked tendency to flip over rearwards in waves or if running at an excessive trim angle.

5) Many hulls of known art have a tendency to 'dig-in' whilst turning at high speeds—particularly in wave conditions. This can cause the lift force vector to pass below the centre of gravity and thereby cause the craft to flip sideways. This is particularly the case for deep Vee hulls which are notoriously difficult to pilot at speed under such conditions.

6) In a steady turn the centripetal force, together with the side force exerted by the propulsor or rudder which is required to turn the craft, has to be balanced by an equal force generated by the hull. Vee type planing hulls are not well adapted to provide such side force and can in fact cause considerable drag and the resulting flow over the hull can cause disturbed entry conditions to the propulsor, resulting in loss of thrust.

In recent years a number of improvements to planing hulls have been proposed to reduce the variation of the position of the centre of lift with speed and to improve hydrodynamic stability. Examples of such improvements are U.S. Pat. No. 4,903,626 (Haines), U.S. Pat. No. 5,111,767 (Haines) and U.S. Pat. No. 5,685,253 (Alexander) which all show a vented cut-out in the rear transom such that the hydrodynamic centre of lift of the design lifting surface is moved forward. This has the effect of allowing the hydrodynamic centre of lift to be vertically aligned with the centre of gravity at the design speed such that the requirement for a downward trim force is negated at design speed. Furthermore the resulting longitudinally extended lifting surface aides longitudinal stability and helps reduce the onset of porpoising. Hulls of this type still require a positive (upward) trimming force to be applied at the stern at lift-off speed (sometimes also referred to as planing speed) to overcome the moment due to the hydrodynamic lift centre being forward of the centre of gravity, resulting in a lifting surface at lift-off which has two narrow rearward-extending legs which result in considerable hydrodynamic drag.

BRIEF DESCRIPTION OF THE INVENTION

It is an aim of the present invention to avoid or minimise one or more of the foregoing disadvantages.

According to a first aspect of the invention there is provided a hull for a water craft, wherein the centre of gravity of the hull is substantially vertically aligned with the centre of hydrodynamic lift of a lifting surface of the hull, both at lift-off speed and at design speed; characterised in that the aspect ratio of the wetted hull at design speed is in the range of 2.5 to 5.0.

The centre of gravity and centre of hydrodynamic lift are preferably substantially aligned at all hull speeds between lift-off and design speed and above, and may also be substantially vertically aligned at hull speeds below lift-off (i.e. displacement speeds).

Such a hull has the advantage of improved hydrodynamic stability and generally does not require trim devices. The aspect ratio of the hull at lift-off speed is preferably in the range of 1.5 to 2.5.

Preferably, a leading edge of the wetted area of the hull at design speed is generally transverse to the direction of forward movement of the hull, along at least a portion, preferably a substantial portion, of its length, whereby a spray sheet which may be created by the hull, in use thereof, is projected generally forwards such that the craft rides over the spray sheet. This has the advantage that entrained air in the spray tend to reduce skin friction when the craft rides forward over the spray.

The hull is preferably formed and arranged such that, if a craft incorporating the hull pitches such that the bow of the AMENDED SHEET craft raises, the hydrodynamic centre of lift ($C_p$) moves sharply rearwards as the stern of the craft becomes immersed. Since the centre of gravity ($C_g$) of the hull is then forward of the hydrodynamic centre of lift ($C_p$), the weight of the craft will apply a restoring moment to the craft which stabilizes the craft. Advantageously, the hull may also be formed and arranged such that, if a craft incorporating the hull pitches such that the bow of the craft lowers, the hydrodynamic centre of lift ($C_p$) moves sharply forwards. Since the centre of gravity ($C_g$) of the hull is then rearward of the hydrodynamic centre of lift ($C_p$), the weight of the craft will again apply a restoring moment to the craft. These features tend to reduce longitudinal instability and porpoising of the hull.

The hull is preferably of generally delta-shape in plan view, comprising a central portion and two side wing portions. Each side wing portion advantageously extends laterally and rearwardly from the central portion of the craft, so as to define an open area therebetween, adjacent a transom of the central portion of the hull. The hull may additionally include a cover portion which covers this open area if desired, provided that the area below the cover portion is well vented.

The hull is preferably provided with two propellers attached to the transom of the central portion of the hull. The propellers are preferably of the type described and claimed in International Application No. PCT/GB/00388.

The hull may advantageously incorporate an abruptly downswept trailing edge portion. The trailing edge portion may be integrally formed in the hull or may conveniently be provided in the form of a rear flap means affixed to a trailing end of the hull, the flap means projecting generally downwardly from the hull at an angle of greater than 45 degrees, preferably at an angle of substantially 90 degrees, to the free water surface (at design conditions). Such a flap means is described in detail in my UK application filed the same day as the present application and entitled "Hulls for Planing and Semi-planing craft", the content of which is incorporated herein by reference. The flap means preferably extends over the full width of the transom of the central portion of the hull and preferably also extends across the full length of inner and trailing edges of each side wing portion defining the open area at the rear of the hull. The chord of the flap means is preferably variable. The chord of the flap means at the transom of the central portion of the hull may advantageously be independently variable of the chord at the inner and trailing edges of the wing portions.

The central portion of the hull may include a nose portion which advantageously comprises a forward surface extending rearwardly and downwardly from a nose of the hull towards a trailing end portion of the central portion of the hull, and lightly cambered in longitudinal section thereof such that the angle of said forward surface relative to the water surface, in use of the hull, is progressively reduced along the length of said nose portion towards said trailing end portion of the hull. This feature is also described in detail in my above-mentioned UK patent application entitled "Hulls for Planing and Semi-planing Craft" already incorporated herein by reference.

Preferably, each side wing portion is lightly cambered in transverse cross-section thereof such that the angle of an underside of each side wing portion relative to the water surface is progressively reduced from a tip of the wing portion, along the transverse width of the wing portion, towards the central portion of the hull. Each side wing portion is preferably also similarly lightly cambered in longitudinal section thereof.

The cambered surfaces of the hull of the invention lead to much reduced lateral drag and thus less tendency for the hull to "dig in" while turning.

The hull may further include a fin or keel which may be formed and arranged so that the centre of lateral resistance thereof is substantially vertically aligned with the centre of gravity of the hull. The fin may be retractable to reduce drag when not required.

BRIEF DESCRIPTION OF THE DRAWING

Preferred embodiments of the invention will now be described by way of example only and with reference to the accompanying drawings in which:

FIG. 1 is a side elevation of a planing hull of known art operating at sub-planing speed;

FIG. 2 shows the hull of FIG. 1 operating at its design speed and attitude;

FIG. 11 is a schematic side view of an embodiment of the invention incorporating a chine hull and fold-up wings;

FIG. 12(a) is a cross-sectional view of the hull of FIG. 11, taken along the line BB, showing the fold-up wings in their lowered positions; and FIG. 12(b) is a cross-sectional view of the craft of FIG. 11, taken along the line AA.

DESCRIPTION OF PRIOR ART HULL FORMS

FIG. 1 shows a hull 1 operating at a speed below the lift-off speed. (It will be appreciated that lift-off is the point in time at which a craft reaches its minimum sustained planing speed.) The free water surface 2 is distorted due to the bow-wave created by the hull. The hull has a positive angle of incidence $\alpha_1$ at its entry point 3 relative to the free water surface 2. The hydrodynamic centre of lift $C_p$ (also known as the "lift center" or the "centre of pressure") is forward of the centre of gravity $C_g$ and the resulting clockwise moment is balanced by arranging that the direction of the thrust T generated by the propeller 4 generates an equal anticlockwise moment about $C_p$. Alternatively transom flaps may be fitted to move the centre of lift $C_p$ aft such that it is vertically aligned with the centre of gravity $C_g$.

FIG. 2 shows the same hull 1 operating at its design speed. The free water surface 2 is now much less distorted by the hull. The hull has a positive angle of incidence $\alpha_1$ at its entry point 3 relative to the free water surface 2. The centre of lift $C_p$ is now aft of the centre of gravity $C_g$ and the resulting anti-clockwise moment is balanced by arranging that the direction of the thrust T generated by the propeller 4 generates an equal clockwise moment about $C_p$. Alternatively transom flaps may be adjusted to provide negative lift such as to move the centre of lift $C_p$ forward such that it is vertically aligned with the centre of gravity $C_g$.

Figure 3:
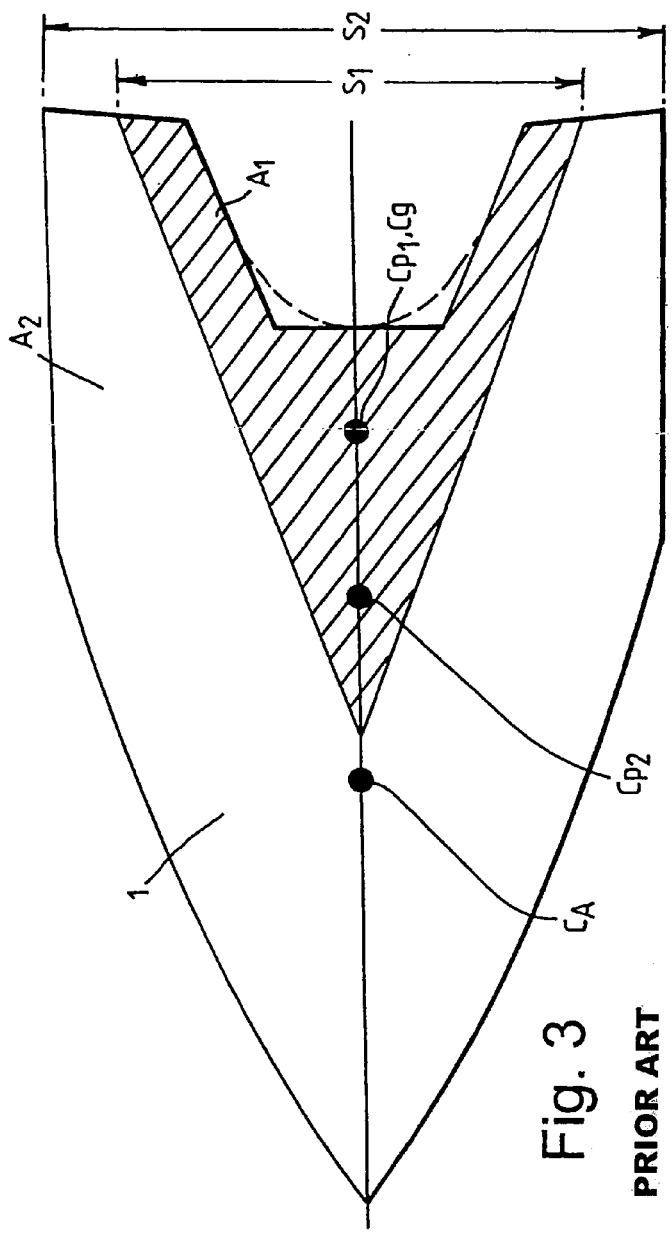
FIG. 3 is a plan elevation of an improved hull of known art.
Figure 4:
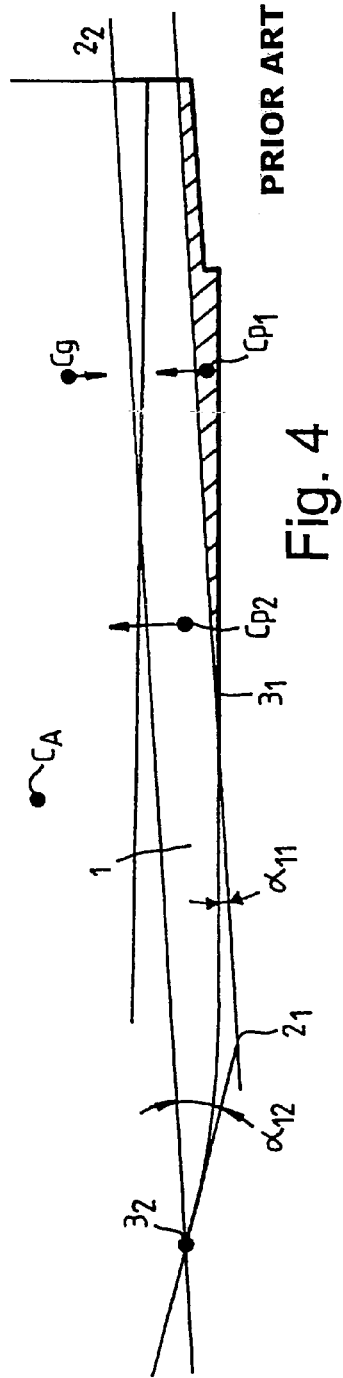
FIG. 4 is a side elevation of the hull of FIG. 3.

FIG. 3 shows a plan elevation of a hull 1 of the type proposed in U.S. Pat. No. 5,685,253, showing half the lifting surface area of the hull at the lift-off speed and the design speed of the hull. FIG. 4 is a side elevation of these same surfaces. Suffix 1 refers to values at design speed and suffix 2 to values at planing speed (i.e. lift-off). At the design speed the hull 1 intersects the free water surface 21 at an angle of incidence $\alpha_{11}$, the centre of lift is at $C_{p1}$ and the water-plane area (i.e. area of the planar intersection of the undisturbed water surface with the hull) is $A_1$ and has a span $S_1$. The centre of gravity $C_g$ is vertically aligned with the centre of lift $C_{p1}$. At lift-off speed the lift surface area $A_2$ is much greater but the span $S_2$ is only marginally increased. In this case the lift centre $C_{p2}$ is significantly forward of the centre of gravity $C_g$ so that the hull will need trimming by some means. The lift-off angle of incidence $\alpha_{12}$ will normally be significantly greater than the design angle of incidence $\alpha_{11}$ to provide an increased lift coefficient.

DETAILED DESCRIPTION OF AN EMBODIMENT ACCORDING TO THE INVENTION

Figure 5:
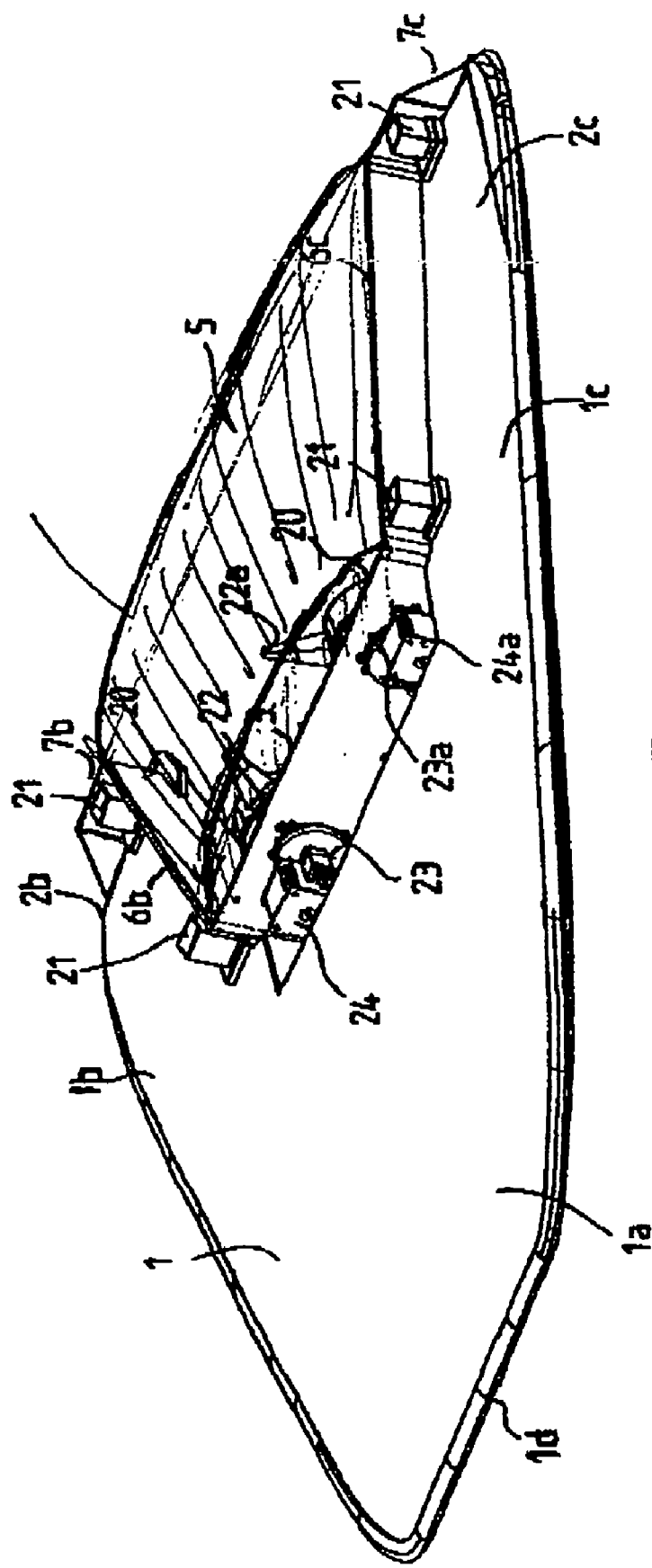
FIG. 5 is an isometric view from above of a hull according to the present invention.
Figure 6A:
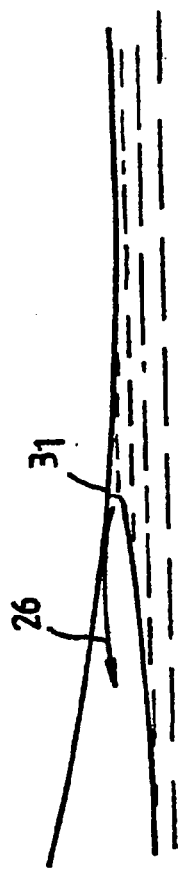
FIG. 6A is a schematic side view of a portion of the hull of FIG. 6, showing a spray sheet created by the hull.
Figure 6:
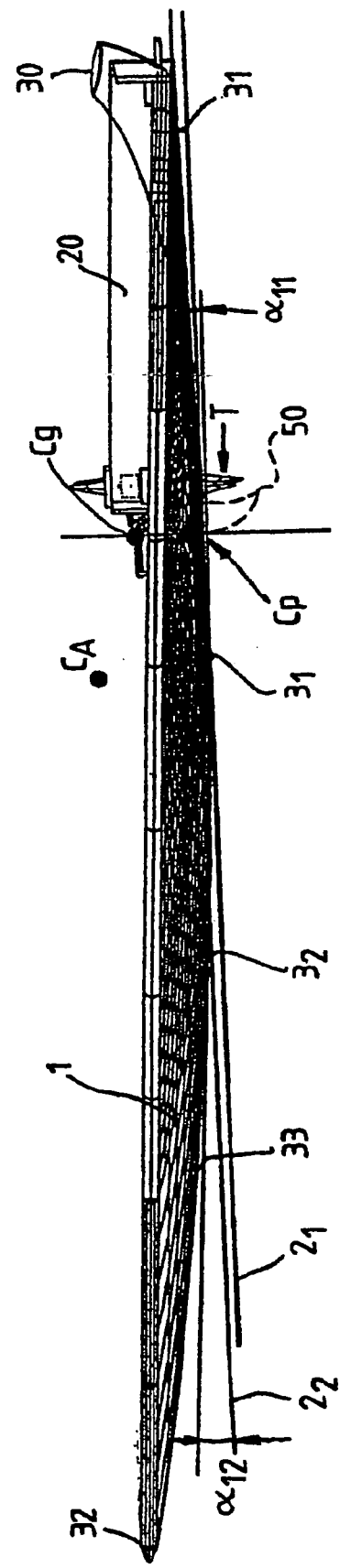
FIG. 6 is a side elevation of the hull of FIG. 5.

FIG. 5 is an isometric view from above of a hull according to a preferred embodiment of the invention. FIG. 6 is a side elevation of the hull. As seen from FIG. 5, the hull 1 is generally delta-shaped, having a central portion 1a and two side wing portions 1b, 1c extending laterally and rearwardly from the central portion 1a. Each side wing portion 1b, 1c incorporates a trailing end portion 2b, 2c which projects rearwardly behind a transom 3 of the central portion 1a of the hull, the trailing end portions of the wing portions 1b, 1c defining an open area 5 at the rear of the hull, adjacent the transom 3 of the central portion 1a thereof. The generally delta-shape of the hull provides good aerodynamic stability by moving the aerodynamic lift centre $C_a$ much further aft than in some known prior art. Comparing the hull of FIG. 5 with the prior hull of FIG. 3 it can be seen that the open area or "cut-out" 5 of the hull of the present invention is generally deeper and wider in length and width, relative to the full length and width of the hull, than the open area provided in the prior art hull. The aerodynamic lift centre $C_a$ is much further aft in the hull of FIG. 5 than in the hull of FIG. 3, as shown in the drawings. Moreover, the nose id of the central portion 1c of the hull of FIG. 5 is much broader and blunter than the pointed V-shaped nose of the hull of FIG. 3.

In the preferred embodiment shown in FIG. 6, a forward portion of the underside of the central portion 1a of the hull is lightly cambered, as described in my afore-mentioned other application filed concurrently with the present application, such that the angle of said forward surface relative to the water surface, in use of the hull, is progressively reduced along the length of said nose portion towards said trailing end portion of the hull.

In this preferred embodiment, a rear flap 20 is also fixed to hull 1 so as to lie at an angle of 90 degrees to the design water plane $2_1$. The flap 20 forms the transom 3 of the central portion 1a of the hull, and extends along the full length of the inner edges 6b, 6c of the two projecting portions 2b, 2c of the side wing portions 1b, 1c, and across the trailing edges 7b,7c thereof. Variable surface propellers 22,22a as described in PCT Application No PCT/GB99/00388 are driven by variable speed electric motors 24, 24a via reducing gearboxes 23, 23a which are bolted to the flap 20. (Other embodiments are possible which do not incorporate the flap 20 shown in FIG. 5. In such cases it will be appreciated that the gearboxes 23, 23a will instead be mounted to the rear end of the central portion 1a of the hull.)

It will be appreciated that the hull is capable of providing little side thrust to balance any side force excerpted by the propeller(s) during turning of the hull and that a fin or keel 50 such as shown (in broken lines) in FIG. 6 (extending downwardly from an underside of the hull) may be required to provide any such side thrust. In fact, the variable surface drive propellers 22,22a allow turning moment to be provided by increasing the thrust of one propeller while reducing the thrust of the other and in this case very little or no side force is exerted on the hull by the propellers. The underside 50b,50c of each side wing is lightly cambered in both transverse and longitudinal cross-section thereof, so that the angle the underside of each side wing makes with the water surface is progressively reduced along the transverse and longitudinal length of the side wing, from the tip 10b,10c of each wing towards the central portion of the hull, and from the trailing edge 7b,7c of each wing towards the forward end of each wing, respectively.

Figure 7:
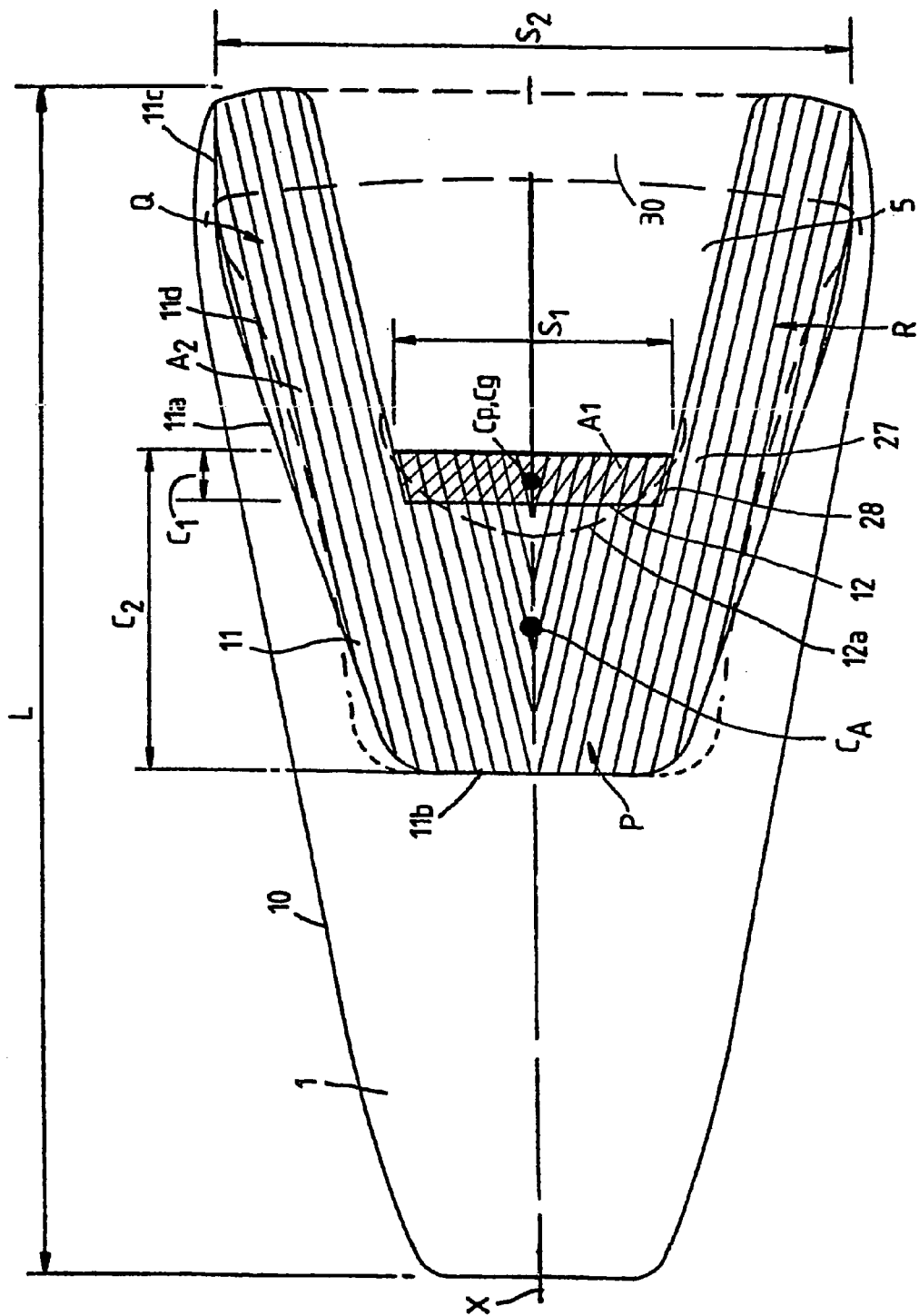
FIG. 7 is a plan elevation of the hull of FIGS. 5 and 6, showing lifting surfaces thereof, and with a rear flap and propellers omitted for clarity.

FIG. 7 shows a schematic plan elevation of the underside of the hull 1, showing the lifting surfaces of the hull at the planing speed and the design speed of the hull 1. To avoid confusion, the rear flap 20 and propellers have been omitted from FIG. 7. Again, suffix 1 refers to values at design speed and suffix 2 to values at lift-off speed. As shown in FIG. 6, at the design speed the hull 1 intersects the free water surface $2_1$ at point 31 in FIG. 6, at an angle $\alpha_{11}$, and the hydrodynamic centre of lift $C_p$ of the hull is approximately halfway along the chord C1 of the design lift area $A_1$ and is vertically aligned with the centre of gravity $C_g$ of the hull. The aerodynamic centre of lift $C_a$ is forward of the hydrodynamic centre of lift $C_p$ and in fact lies above the hull 1. The vertical position of $C_a$ relative to the hull is shown in FIG. 6. The water-plane area is $A_1$ and has a span $S_1$, at the design speed. By reference to FIG. 3 and FIG. 7 it will be evident that the aspect ratio ($S^2/A$) at the design speed is much greater for the hull of FIG. 7 than is the case for the prior art hull of FIGS. 3 and 4. Also, it will be noted that the lift area at design speed is generally in the shape of a thin rectangle, without any thin rearwardly extending leg portions like those of the design lift area in the hull of FIG. 3.

At lift-off speed the hull 1 intersects the free water surface $2_2$ part-way along the length of the hull at point $3_2$ at an angle $\alpha_{12}$. It will thus be noted that a forward portion of the hull is not in contact with the water surface at lift-off speed. The lift surface area $A_2$ and the span $S_2$ are both greater than $A_1$ and $S_1$ (the lift surface area and span respectively at design speed i.e. the speed at which the craft is designed to operate) but although the aspect ratio $(S_1^2/A_1)$ for design conditions is lower than the aspect ratio $(S_2^2/A_2)$ at lift-off it is still high compared with the aspect ratio for the prior art hull of FIGS. 3 and 4. The shape of the lift-off and design lift areas $A_2, A_1$, as can be seen from FIG. 7, are such that their centers are coincident. Thus, the lift centre $C_{p2}$ at lift-off is coincident with the lift centre $C_{p1}$ at design speed. It will be noted that the lift Area $A_2$ at lift-off in the hull of FIG. 7 is generally more U-shaped than V-shaped, having a thick forward portion P and two rearwardly extending leg portions Q,R. In the hull 1 of FIGS. 5, 6 and 7, the lift centre $C_p$ remains vertically aligned with the center of gravity $C_g$ at both lift-off and design conditions. The angle of incidence $\alpha_{12}$ is greater than $\alpha_{11}$ so as to provide an increased lift coefficient but the attitude of hull 1 remains sensibly unchanged. The thrust T is virtually aligned with the centre of pressure $C_p$ about which it provides little moment.

The transverse line 12 in FIG. 7 is the forward portion of the leading edge 28 at which the water-plane meets the hull at design conditions corresponds to point $3_1$ in FIG. 6. In FIG. 7 this line 12 is shown perpendicular to the longitudinal axis X of the hull, but in other possible embodiments the leading edge 28 may follow some other path which is generally transverse over the majority of its length, such as the curvilinear path 12a shown in broken line in FIG. 5. From FIG. 5 it will be evident that the span $S_1$ of the lifting surface at the design point is large relative to the chord C1 thereof (i.e. the wetted length of the hull, in the longitudinal direction) and that line 12 being in a generally transverse direction will cause the spray sheet 26 shown in FIG. 6A to be projected generally forwards such that the craft will ride over it. In practice, if the angle $\alpha_{11}$ is small the amount of spray generated is minimal but is still sufficient for entrained air generated as the hull rides over it to sensibly reduce the friction resistance. Another advantage of the high aspect ratio is that the pressure peaks generated at the leading edge of the wetted section (and also at the trailing edge of the wetted section in the preferred embodiment of the hull, described below with reference to FIG. 7) will remain sensibly at their theoretical two dimensional values over the majority of the span. Due to the presence of the portion 27 of the lift-off lift area $A_2$ surrounding the design lift area $A_2$, the tip losses resulting from the pressure reduction at the leading edge 28 of the design lift area $A_1$ are significantly reduced compared to those for aircraft wings of the same aspect ratio.

At lift-off speed a forward portion 11$b$ of the leading edge 11 of the wetted section (this forward portion corresponds to point $3_2$ in FIG. 6) is preferentially arranged such that it is transverse over a large proportion of the wetted span $S_2$ such that the craft rides over the forward-projected spray sheet as before. In this case a rear portion 11$a$ of the leading edge 11 bends sharply aft, blending into a tip section 11$c$. The precise shape of line 11 may be determined to optimise the balance of the boat and to minimise the wetted area. For instance, it may sweep back at a steeper angle and then sweep out to form a winglet at the stern as shown by line 11$d$ in FIG. 7.

Longitudinal Stability

By reference to FIGS. 5, 6 and 7 it will be evident that if the craft pitches such that its bow 32 raises the hydrodynamic centre of lift $C_p$ will move sharply rearwards as the stern of the craft 31 becomes immersed. The centre of gravity $C_g$ now being well forward of the hydrodynamic centre of lift $C_p$, the weight of the craft will apply a strong restoring moment to stabilize the craft. This rearward movement of the centre of lift also has the effect of reducing the pitch angle.

In the case that the bow 32 lowers, the leading edge of the wetted area 12 will move rapidly forward and, in the case where the hull 1 has a longitudinal section wherein the forward surface of the central portion 1$a$ of the hull is of generally lightly cambered form (as afore-described), the hull will tend to roll forward such that the centre of hydrodynamic lift $C_P$ will move rapidly forward whilst the angle of incidence $\alpha_{11}$ remains sensibly constant. The generally delta-shape of the hull, and high aspect ratio thereof, is designed so that the hydrodynamic centre of lift $C_p$ may typically move from 60% of the craft length to 100% for an incidence change of 3 or 4 degrees. The accentuated movement of the hydrodynamic lift centre forwards or aft for small changes in pitch angle renders the craft extremely stable in pitch.

Aerodynamic Stability

Whilst the stern cut-out (open area 5) of the hull of FIGS. 5 and 6 is shown open, it may conveniently be decked over or otherwise covered in, provided that the space created remains well vented. Covering the cut-out will have the effect of moving the aerodynamic centre of lift $C_a$ further aft. A tail fin or keel 30 may also be provided for this purpose. In the case that the hull starts to pitch such that the aerodynamic lift would be increased (e.g. in severe wind and/or wave conditions which cause the craft to adopt a high angle of attack) the centre of hydrodynamic lift $C_p$ will move sharply rearwards as the stern 31 of the craft becomes immersed. The centre of gravity $C_g$ now being well forward of the hydrodynamic centre of lift the weight if the craft will apply a strong restoring moment to stabilize the craft and prevent it flipping rearwards.

Turning

The fin 50 is configured such that its own centre of gravity is vertically aligned with its centre of lateral pressure is aligned with the centre of gravity of the craft. The fin 50 operates at low slip angle and creates very little drag in turning maneuvers. The fin also operates at low drift angles and will only minimally influence the flow to the propellers. The fin 50 is also retractable so that it can be retracted when not required.

The position of flap 20 can be adjusted relative to hull 1 to provide a variable flap chord as provided for in my afore-mentioned other UK patent application filed on the same day as the present application. Four low pressure hydraulic actuators 21 provide differential adjustment at the front and the rear of the flap. Adjustment means (not shown) may beneficially be provided to adjust the heights of the gearboxes 23,23$a$ relative to the flap 20.

Figure 8:
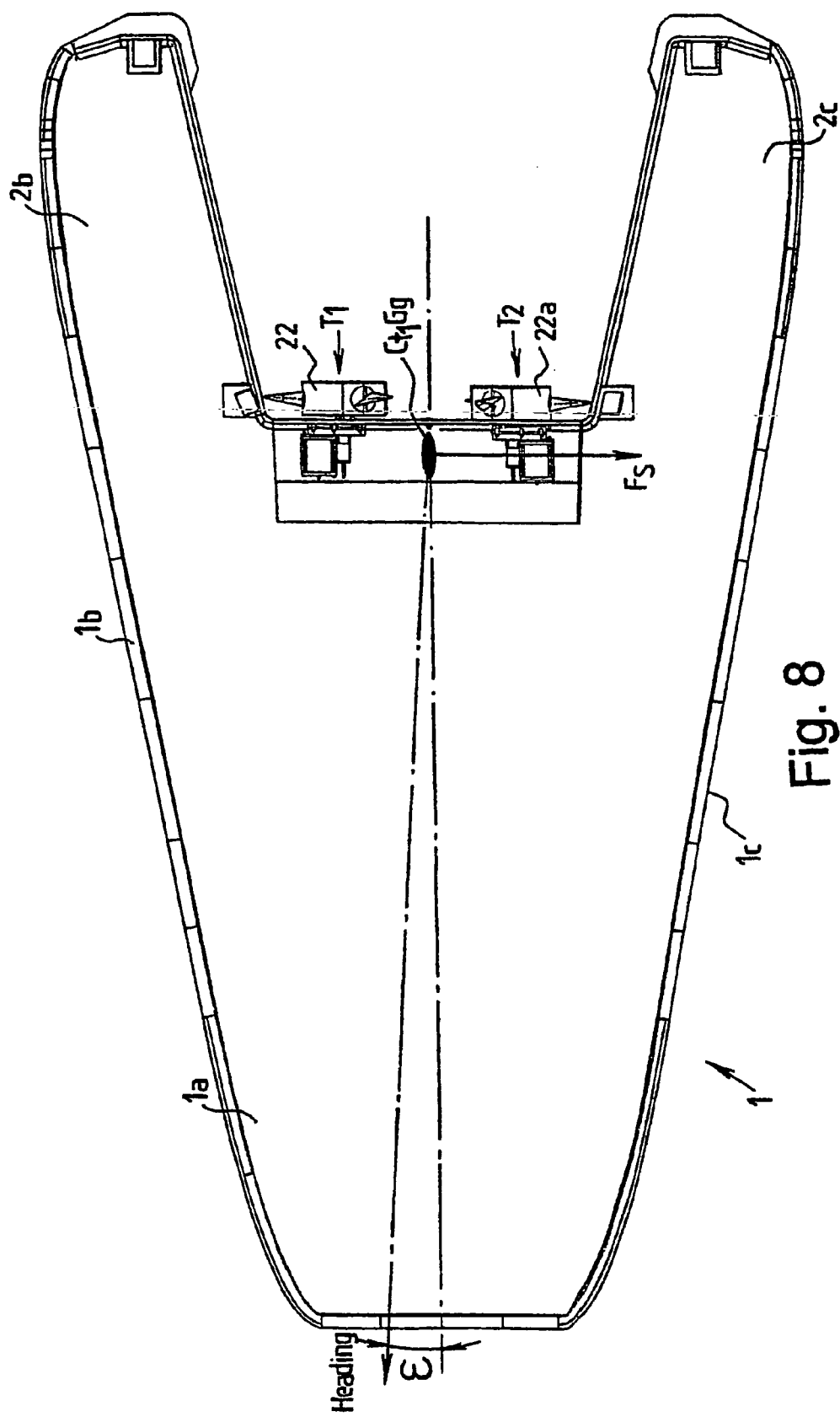
FIG. 8 shows the hull of FIG. 6 in plan elevation.
Figure 9:
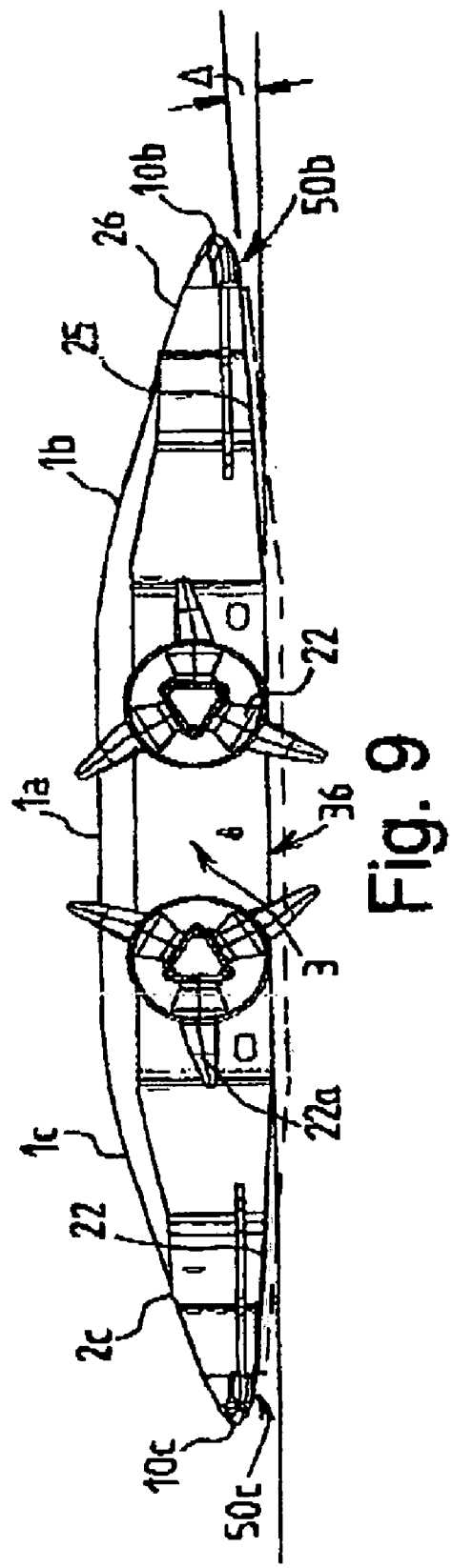
FIG. 9 shows the hull of FIG. 6 in rear elevation.

FIG. 8 is a plan view of the embodiment of FIG. 7, and FIG. 9 is a rear view of the same embodiment from which it can be seen that the two side wing portions 2$b$,2$c$ are each inclined upwardly at an angle $\Delta$ to the underside 36 of the central portion 1$a$ of the hull. The angle $\Delta$ is chosen to be in the range of typically 2 to 10 degrees. This provides a suitable span at lift-off and at the design point, as well as giving smooth entry conditions to the hull during turning maneuvres.

Figure 10:
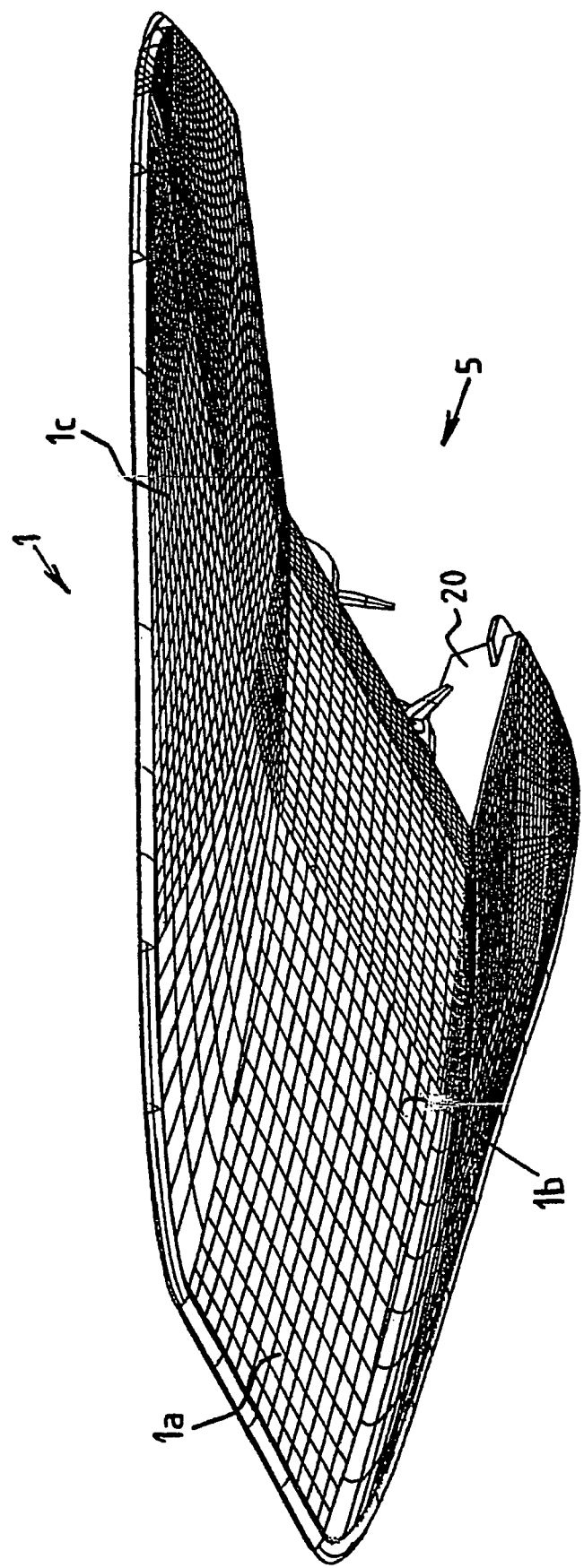
FIG. 10 is an isometric view of the underside of the hull of FIG. 6.

FIG. 10 is an isometric view of the underside of the embodiment of FIG. 6 from which the fair lines and the absence of drag-producing appendages will be evident.

It should be noted that the hull width in the above-described embodiment of FIG. 5 is generally greater than for known prior art hulls and allows the higher aspect ratios of the hull of the present invention to be achieved, and also increases the Froude number of the hull, as well as providing enhanced lift/drag ratios. The wide hull also helps provide advantageous entry conditions in turning maneuvres. Typically, the hull length to hull width ratio of a hull according to the invention will lie in the range of from 1.75 for small leisure craft, up to 3.0 or more for large ships.

It will be appreciated that in the hulls according to the invention as described above, the configuration of the hull is such that lift and drag are substantially independent of craft heading $\epsilon$ i.e. the angle between the actual direction of travel and the longitudinal axis of the craft, as shown in FIG. 8. In effect, small heading angles (of a few degrees) do change any significant change in the longitudinal section of the hull. This is largely due to the rounded and blunt-nosed shape of the nose portion of the hull which is designed so that a section through the hull at any point is very similar to the longitudinal section of the hull. The result is to provide smooth entry without creating negative values of the pressure coefficient at all forward values of the craft heading. This has the advantage of ensuring that speed is not lost in a turn.

The embodiment of the hull shown in the Figs. is generally intended for a small electrically driven hydroplaning leisure craft, although the hull of the invention is also applicable to other types of craft. Chine hulls may be blended onto the top of the hull form shown in the Figs., where higher volume is required for living accommodation, or freight storage volume, etc. FIG. 11 illustrates schematically such a hull 40 having a lower hull section 41 and a chine hull 42 blended thereto. Hulls with fold-up wings 1$b$,1$c$ or foils, or with fold-up stern extensions, are also possible, in order to enable the beam or length of the hull to be reduced in order to satisfy berthing requirements, PANAMAX (permitted width for traversing the Panama canal)

etc. The hull of FIG. 11 has a pair 43b,43c of such fold-up wings and a stern extension 46. FIG. 12 illustrates the craft with the wings in their lowered positions 44b,44c. Each wing may be raised to its stowed position 45b,45c when necessary to reduce hull width and/or length.

It will further be appreciated that although the hull of the invention has been designed so that its centre of gravity $C_g$ and centre of hydrodynamic lift $C_p$ are substantially vertically aligned both at lift-off and design speed, in practical operation of a craft incorporating the hull small deviations from vertical alignment of $C_g$ and $C_p$ are tolerable, and in some cases may be unavoidable. For example, whilst part of the variable load (such as fuel tanks) of the hull may be positioned close to the centre of gravity, the rest of the variable load may be positioned elsewhere, which means that the precise position of the centre of gravity will often vary to at least some extent in practical use of the hull. Generally the flap chord, hull chord, and hull attitude (trim angle) may be varied in such cases in order to optimise the lift/drag ratio whilst maintaining the stability criteria (a "smart" controller may be provided for this purpose).

As an example of tolerated variation in the position of the centre of gravity $C_g$ relative to $C_p$, for a small leisure craft we propose that variation in the position of $C_g$ relative to $C_p$ (horizontally) by up to approximately 3% of the craft's length (at lift-off or at design speed) will result in a variation in the hull attitude (trim angle) of approximately only 0.3 degrees.

It will further be understood that the precise relative position of the centre of lift $C_p$ to the centre of gravity $C_g$ will at least to some extent depend on moments due to forces including: propulsor thrust forces, inertial forces, aerodynamic lift and drag forces acting on the craft at any one time. For all but very high speed craft, or lightweight craft operating at very high angles of incidence, the aerodynamic moments acting on the craft are small. The thrust moment is also ideally quite small and inertial moments are quite small except for lightweight craft whilst accelerating rapidly. Nevertheless, movement in the centre of pressure can in most cases be taken care of, if desired, by a small change in the hull attitude (namely the trim angle) so as to modify the shape of the lifting surface and consequently the centre of lift $C_p$. Where a smart controller system is provided, the adjustment may be made by altering the flap position such as to vary the lift coefficient and the centre of lift $C_p$. Alternatively, the adjustment may be made by a combination of these two methods.

Similarly, variation in the position of the centre of gravity can be allowed for at design speed either by allowing the craft to pitch slightly forward to move the centre hydrodynamic lift $C_p$ forward, or to allow the craft to pitch slightly rearward to move the centre of lift aft. Alternatively, the flap chord can be slightly decreased which lowers the lift coefficient thus increasing the chord and moving the centre of lift forward, or increasing the flap chord which moves the centre of lift aft.

For any particular craft, the centre of lift at speeds below the design speed may be varied by increasing or decreasing the flap chord at the forward end of the cut-out 5 and at the rear of the craft. Increasing the flap chord increases the lift so that by increasing the flap chord for the central portion 1a and decreasing it for the wings, more lift will be generated by the forward central portion and less will be generated by the wings portions 2b,2c which are situated further aft. The effect would be to move the centre of lift forward (or to pitch the craft rearward). Increasing the flap chord for the wing portions and decreasing the flap chord for the central portion of the hull will have the opposite effect.

What is claimed is:

1. A hull for a water craft, wherein the center of gravity (Cg) of the hull is substantially vertically aligned with the center of hydrodynamic lift (Cp) of a lifting surface of the hull, both at lift-off speed and at design speed; and wherein the aspect ratio $(S_1^2/A_1)$ of the wetted hull at design speed is in the range of 2.5 to 5.0 and is substantially rectangular; and has the shape of a delta at liftoff speed.

2. A hull according to claim 1, wherein the center of gravity (Cg) and center of hydrodynamic lift (Cp) are substantially vertically aligned at all hull speeds between lift-off and design speed and above.

3. A hull according to claim 2, wherein the center of gravity (Cg) and center of hydrodynamic lift are also substantially vertically aligned at hull speeds below liftoff.

4. A hull according to claim 1, wherein the aspect ratio $(S_2^2/A_2)$ of the hull at lift-off speed is in the range of 1.5 to 2.5.

5. A hull according to claim 1, wherein a leading edge of the wetted area of the hull at design speed is generally transverse to the direction of forward movement of the hull along at least a portion of its length, whereby a spray sheet which may be created by the hull, in use thereof, is projected generally forward such that the craft rides over the spray sheet.

6. A hull according to claim 5, wherein the leading edge of the wetted area of the hull at design speed is generally transverse to the direction of forward movement of the hull along at least a substantial portion of its length.

7. A hull according to claim 1, wherein the hull is of generally delta-shape in plan view, comprising a central portion and two side wing portions.

8. A hull according to claim 7, wherein each side wing portion extends laterally and rearwardly from the central portion so as to define an open area there between adjacent a transom of the central portion of the hull.

9. A hull according to claim 8, wherein the hull additionally includes a cover portion for covering this open area.

10. A hull according to claim 9, wherein the hull is provided with two propellers attached to the transom of the central portion of the hull.

11. A hull according to claim 8, further including an abruptly downswept trailing edge portion.

12. A hull according to claim 11, wherein said trailing edge portion is integrally formed in the hull.

13. A hull according to claim 11, wherein said trailing edge portion is provided in the form of a rear flap means affixed to a trailing end of the hull, the flap means projecting generally downwardly from the hull at an angle of greater than 45 degrees to the free water surface, at design conditions.

14. A hull according to claim 13, wherein the flap means projects generally downwardly from the hull at an angle of substantially 90 degrees.

15. A hull according to claim 14, wherein said flap means extends over the full width of the transom of the central portion of the hull and also extends across the full length of inner and trailing edges of each side wing portion defining the open area at the rear of the hull.

16. A hull according to claim 13, wherein the chord of the flap means is variable.

17. A hull according to claim 13, wherein the chord of the flap means at the transom of the central portion of the hull is independently variable of the chord of the flap means at the inner and trailing edges of the wing portions.

18. A hull according to claim 7, wherein the central portion of the hull includes a nose portion which comprises a forward surface extending rearwardly and downwardly from a nose of the hull towards a trailing end portion of the central portion of the hull, and lightly cambered in longitudinal section thereof such that the angle of said forward surface relative to the water surface in use of the hull, is progressively reduced along the length of said nose portion towards said trailing end portion of the hull.

19. A hull according to claim 7, wherein each side wing portion is lightly cambered in transverse cross-section thereof such that the angle of an underside of each side wing portion relative to the water surface is progressively reduced from a tip of the wing portion, along the transverse width of the wing portion, towards the central portion of the hull.

20. A hull according to claim 19, wherein each side wing portion is also similarly lightly cambered in longitudinal section thereof.

21. A hull according to claim 7, wherein each side wing portion has an underside portion which is inclined to an underside of the central portion of the hull at an angle $\Delta$ which is in the range of 2 to 10 degrees.

22. A hull according to claim 1, further including a keel extending downwardly from an underside of the hull and which is formed and arranged so that the center of lateral resistance of the keel is substantially vertically aligned with the center of gravity ($C_g$) of the hull.

23. A hull according to claim 22, wherein said keel is retractable.

24. A water craft incorporating a hull according to claim 1.

25. A water craft according to claim 24, wherein the hull is formed and arranged such that, if the craft pitches such that the bow of the craft raises, the hydrodynamic center of lift ($C_p$) of the lifting surface of the hull moves sharply rearwards as the stern of the craft becomes immersed.

26. A water craft according to claim 25, wherein the hull is also formed and arranged such that if the craft pitches such that the bow of the craft lowers, the hydrodynamic center of lift ($C_p$) of said lifting surface of the hull moves sharply forward.

* * * * *